United States Patent [19]

Johnson

[11] Patent Number: 6,112,301

[45] Date of Patent: Aug. 29, 2000

[54] SYSTEM AND METHOD FOR CUSTOMIZING AN OPERATING SYSTEM

[75] Inventor: Fred Lipscomb Johnson, Austin, Tex.

[73] Assignee: International Business Machines Corporation, Armonk, N.Y.

[21] Appl. No.: 08/783,977

[22] Filed: Jan. 15, 1997

[51] Int. Cl.[7] .................................................. G06F 9/445
[52] U.S. Cl. ................................... 713/1; 713/2; 713/100
[58] Field of Search ............................... 395/3, 712, 709, 395/651, 652, 653, 872, 885, 900, 681, 500; 364/513, 280.2, 280, 236.2, 243, 280.3

[56] References Cited

U.S. PATENT DOCUMENTS

| | | | |
|---|---|---|---|
| 5,159,547 | 10/1992 | Chand | 364/157 |
| 5,193,144 | 3/1993 | Tsutsumi et al. | 395/76 |
| 5,206,566 | 4/1993 | Yoshida et al. | 318/568.22 |
| 5,245,695 | 9/1993 | Basehore | 395/3 |
| 5,295,061 | 3/1994 | Katayama et al. | 364/157 |
| 5,694,525 | 12/1997 | Yamashita | 395/61 |
| 5,710,868 | 1/1998 | Basehore | 395/3 |

OTHER PUBLICATIONS

Samadi, B, "Tunex: a knowledge–based system for performance tuning of the UNIX operating system", IEEE Transactions of Software Engineering, Jul. 1985.

*Primary Examiner*—Ayaz R. Sheikh
*Assistant Examiner*—Tim Vo
*Attorney, Agent, or Firm*—Sawyer Law Group LLP; Leslie A. Van Leeuwen

[57] ABSTRACT

A system and method for customizing and/or tuning an operating system for a computer. In accordance with the inventive method, a plurality of input values are mapped to membership functions (or fuzzy sets). The input values relate to the status of the operating system, any tasks to be performed thereby, or any other parameter. A set of resource management rules are applied to generate an output corresponding to each input value in accordance with the membership function with which the input values are associated. In the illustrative embodiment, each rule is an 'if-then' statement having a membership function as an antecedent and an output corresponding to the input value as a consequent. The rules are applied and the output defuzzified by an inference engine implemented in hardware or software. For each task to be customized or tuned, the resource management rules are developed by consulting with experts or an expert database to ascertain which resources should be managed and how so as to optimize the performance of the task. The input values may be parameters that are set at installation or boot time that remain fixed until the system is re-installed or re-booted, respectively. In the alternative, the input values may be parameters that are tuned on demand, at predetermined times, or continuously.

39 Claims, 4 Drawing Sheets

SYSTEM AND METHOD FOR CUSTOMIZING AN OPERATING SYSTEM

FIELD OF THE INVENTION

The present invention relates to computing systems and software for same. More specifically, the present invention relates to systems and techniques for customizing and/or tuning operating systems for computing systems and the like.

BACKGROUND OF THE INVENTION

An operating system is a software program which regulates the use of resources associated with a computing system. The system resources managed typically include the central processing unit, memory, and input and output devices associated therewith. The operating system is typically a number of custom written low level routines. These routines are embedded deep within the system code and are therefore not generally available to user.

As a result, the operating system must be designed for a number of predetermined typical applications which are believed to be close to some norm. Unfortunately, the standardized design forces performance compromises which may not be optimal for an individual user or application.

Some operating systems such as UNIX have a number of parameters that can be varied to change the operational characteristics of the entire computer system or sub-system. Some of these parameter's values are fixed at the boot time, while others can be varied while the system is running. The analysis and tuning of these parameters to produce near optimum operation of a computer for a particular application running on a specific hardware configuration is very time consuming and requires a 'hit and miss' approach or manual tuning by a very skilled system expert. Currently, certain attempts are made to control a few of these parameters dynamically, but the control method typically consists of thresholding which frequently produces far less than near optimal results.

Hence, there is a need in the art for a system or technique for providing a more sophisticated dynamic and static tuning of operating system parameters that will allow the operating system to run at a near optimum state to perform a given task in a given application and hardware environment.

SUMMARY OF THE INVENTION

The need in the art is addressed by the present invention which provides an improved system and method for customizing and/or tuning an operating system for a computer. In accordance with the inventive method, a plurality of input values are mapped to membership functions (or fuzzy sets). The input values may relate to the status of the operating system, any tasks to be performed thereby, or any other parameter as will be appreciated by those skilled in the art. A set of resource management rules are applied to generate an output corresponding to each input value in accordance with the membership function with which the input values are associated.

In the illustrative embodiment, each rule is an 'if-then' statement having a membership function as an antecedent and an output corresponding to the input value as a consequent. The rules are applied and the output defuzzified by an inference engine implemented in hardware or software. For each task to be customized or tuned, the resource management rules are developed by consulting with experts or an expert database to ascertain which resources should be managed and how so as to optimize the performance of the task. The input values may be parameters that are set at installation or boot time that remain fixed until the system is re-installed or rebooted, respectively. In the alternative, the input values may be parameters that are tuned on demand, at predetermined times, or continuously.

DETAILED DESCRIPTION OF THE INVENTION

Figure 1:
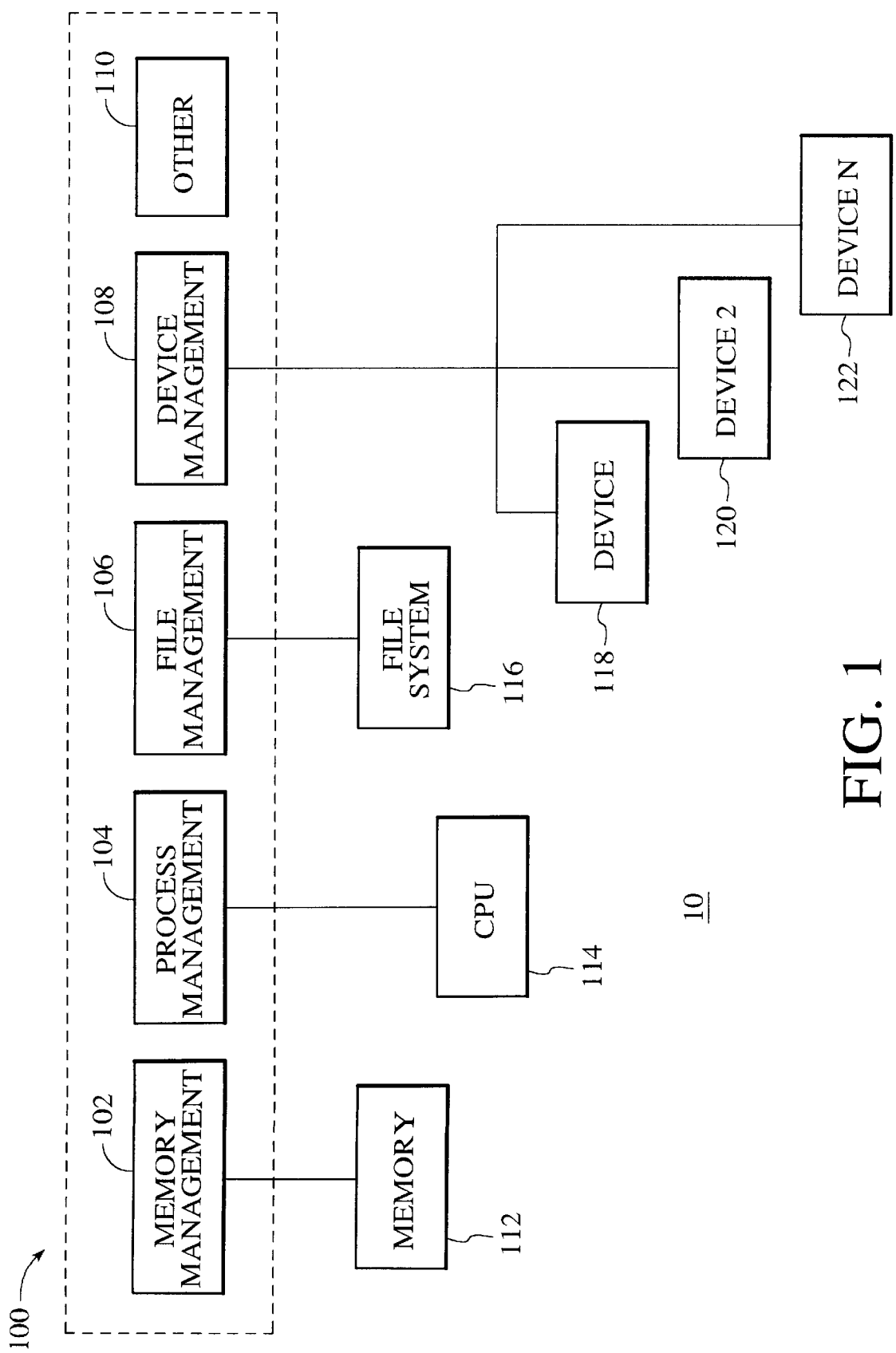
FIG. 1 shows a computer system comprising an operating system optimized and/or tuned in accordance with the teachings of the present invention.

The present invention relates to a system and method for customizing and/or tuning an operating system for a computer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention utilizes fuzzy logic to provide a more nearly optimally tuned operating system for a computer. In accordance with the inventive method, a plurality of input values are mapped to membership functions (fuzzy sets). The input values may relate to the status of the operating system, any tasks to be performed thereby, or any other parameter as will be appreciated by those skilled in the art. A set of resource management rules are applied to generate an output corresponding to each input set of values in accordance with the membership functions with which the input values are associated.

In the illustrative embodiment, each rule is an 'if-then' statement having a membership function as an antecedent and an output corresponding to the input value as a consequent. The rules may be applied and the output defuzzified by an inference engine implemented in hardware or software. For each task to be customized or tuned, the resource management rules are developed by consulting with experts or an expert database to ascertain which resources should be managed and how to optimize the performance of the task. The input values may be parameters that are set at installation or boot time that remain fixed until the system is re-installed or re-booted, respectively. In the alternative, the input values may be parameters that are tuned on demand, at predetermined times, or continuously.

In each of these three classes are groups of related parameters that should be tuned together. A group of parameters would typically control some aspect of a functional sub-system of the operating system such as file systems or virtual memory management. In accordance with the present teachings, the definition of the membership functions, the control rules and the inputs is part of the design process for software modules that modify the parameters within the group.

As discussed in "Fuzzy Logic" by Bart Kosko and Satoru Isaka in the July 1993 issue of Scientific American, pp. 76–81, fuzzy logic is a branch of machine intelligence that helps computers paint gray common sense pictures from an uncertain world. (See also *Fuzzy Thinking*, by Bart Kosko, published by Hyperion Press, 1993, 1st ed.) Fuzzy systems use common sense rules that refer to indefinite quantities that measure the degree to which something occurs or some condition exists. Fuzzy logic is based on rules of the form "if-then" that convert inputs to outputs.

To build a fuzzy system, one defines the degrees of membership in various fuzzy input and output sets with sets of curves. The relation between the input and output sets can be plotted. The product of the fuzzy sets forms a fuzzy patch, an area in the input/output graph that represents the set of all associations that the rule forms between the inputs and the outputs. The size of the patch reflects the vagueness or uncertainty of the rule. The more precise the fuzzy set, the smaller it becomes. The rules of a fuzzy system define a set of overlapping patches that relate a full range of inputs to a full range of outputs. In that sense, the fuzzy system approximates some mathematical function or equation of cause and effect.

Fuzzy systems can approximate any continuous mathematical function. A fuzzy system reasons or infers based on its rule patches. Two or more rules convert any incoming number into some result because the patches overlap. When data trigger the rules, overlapping patches fire in parallel but only to some degree. The degree to which the rules fire determines the proportionality of the curves which represent the rules in a curve of the output data set. Since this output curve does not assist controllers that act on binary instructions, a final step is a process of defuzzification in which the fuzzy output curve is turned into a single numerical value. This is typically achieved by computing the center of mass, or centroid, of the area under the curve. As systems become more complex, the antecedents of the rules may include any number of terms conjoined by "and" or disjoined by "or".

"The clear, long path of fuzzy logic", published in the Jul. 29, 1996 issue of *Electronic Engineering Times*, issue 912 states: "As described in 1965 by Berkeley professor Lotfi Zadeh, fuzzy logic is a valued successor to Boolean logic. Truth, which in the Boolean framework may only have the values of 1 and 0, takes on the full continuum of 1 to 0 in the fuzzy framework. Fuzzy logic uses this expanded continuum to model human notions of classification and degrees of membership in those classes.

The usefulness of the continuum of truth values and its connection with human notions of classification can be seen in an everyday example. To call someone 'tall' reflects our innate ability to classify. Based on our own experience, we easily classify people as short, average, tall and so on, for a very compact description of height that others instantly grasp. We do not need a tape measure and, in fact, using one confuses the issue. Certainly, accurate measurements can yield precise information, but precise information is not necessarily meaningful information. If the measurements lack a fundamental tie to our notion of tallness, very little meaning can be gleaned from them.

The intention of the construct called the 'membership function' or 'fuzzy set' is to provide that fundamental tie between precise measurements and general classifications.

In conjunction with membership functions, fuzzy rules encode the intelligence of a fuzzy model, capturing the essence of knowledge in the model by expressing how model inputs relate to model outputs. Because they are written using linguistic variables (which have been subdivided into overlapping membership functions), fuzzy rules read like a free-form natural language. The ability to express rules in a natural language speeds the process of engineering a solution to a given problem.

Fuzzy-logic rules are built by combining fuzzy propositions such as Temperature is Hot, Humidity is Low, Angle is Acute, Risk is Minimal and so on. Each fuzzy proposition makes a statement about the possible value of the underlying linguistic variable. In the example Temperature is Hot, "temperature" is the linguistic variable and "hot" is one possible value for temperature.

The usefulness of a fuzzy proposition derives not only from the ease with which it conveys our actual understanding, but also from the fact that we can measure the truth of the proposition. With a well-defined Hot membership function and a crisp temperature, we easily compute the degree of truth.

Fuzzification is the term commonly used to describe the process of testing a crisp input against a fuzzy proposition. A fuzzy rule maps fuzzy propositions of input variables to the appropriate fuzzy propositions of output variables. The general form of a fuzzy rule is IF antecedent_1 AND antecedent_2 AND . . . THEN consequent_1 AND consequent_2 AND . . . where antecedent and consequent are the technical terms meaning the fuzzy proposition of an input and output variable, respectively. Hence, the if-side of the rule is composed of one or more antecedents; the then-side of one or more consequents. The structure of the rule is interpreted in a way that is analogous to the familiar Boolean if-then statement. The if-side specifies the conditions of the fuzzy-model inputs that must be true in order for the actions specified on the then-side to take effect. The operations combine the truth values of the antecedents, and to apply those truth values, the consequents are designed specifically for the needs of the fuzzy logic in that they may use the 1–to–0 continuum of truth values.

The responsibility of the rule-evaluation procedure is to both compute the truth value of individual rules and aggregate the effects of all of the rules that define the fuzzy model in question.

The final step, defuzzification, takes the result of the rule evaluation and computes a crisp value for the fuzzy model's final output. In return for one set of crisp inputs, the whole fuzzy machinery produces a crisp output. In deriving a single crisp value from the aggregated fuzzy space, the goal is to find the single crisp value that best represents the whole. Different defuzzification methods try to address the question of how to best represent the whole."

To more fully understand the operation of the present invention in the context of a particular environment, refer now to FIG. 1 which shows a computer system 10 which comprises an operating system 100. The operating system 100 comprises a plurality of resource managers 102, 104, 106, 108 and 110. Each of the resource managers 102–110 (even numbers only) controls the resource with which it is associated. Therefore, in the illustrative embodiment of FIG. 1, the memory manager 102 controls the allocation of memory 112, the process manager 104 controls the use and allocation of a central processing unit (CPU) 114, the file manager 106 controls a file system 116 and the device manager 108 controls a plurality of devices 118. It should be understood that the above-described resource managers are illustrative resource managers present in a typical conventional computer system. Accordingly, one of ordinary skill in the art readily recognizes that other resource managers could be part of the operating system and the use of same would be within the spirit and scope of the present invention.

Figure 2:
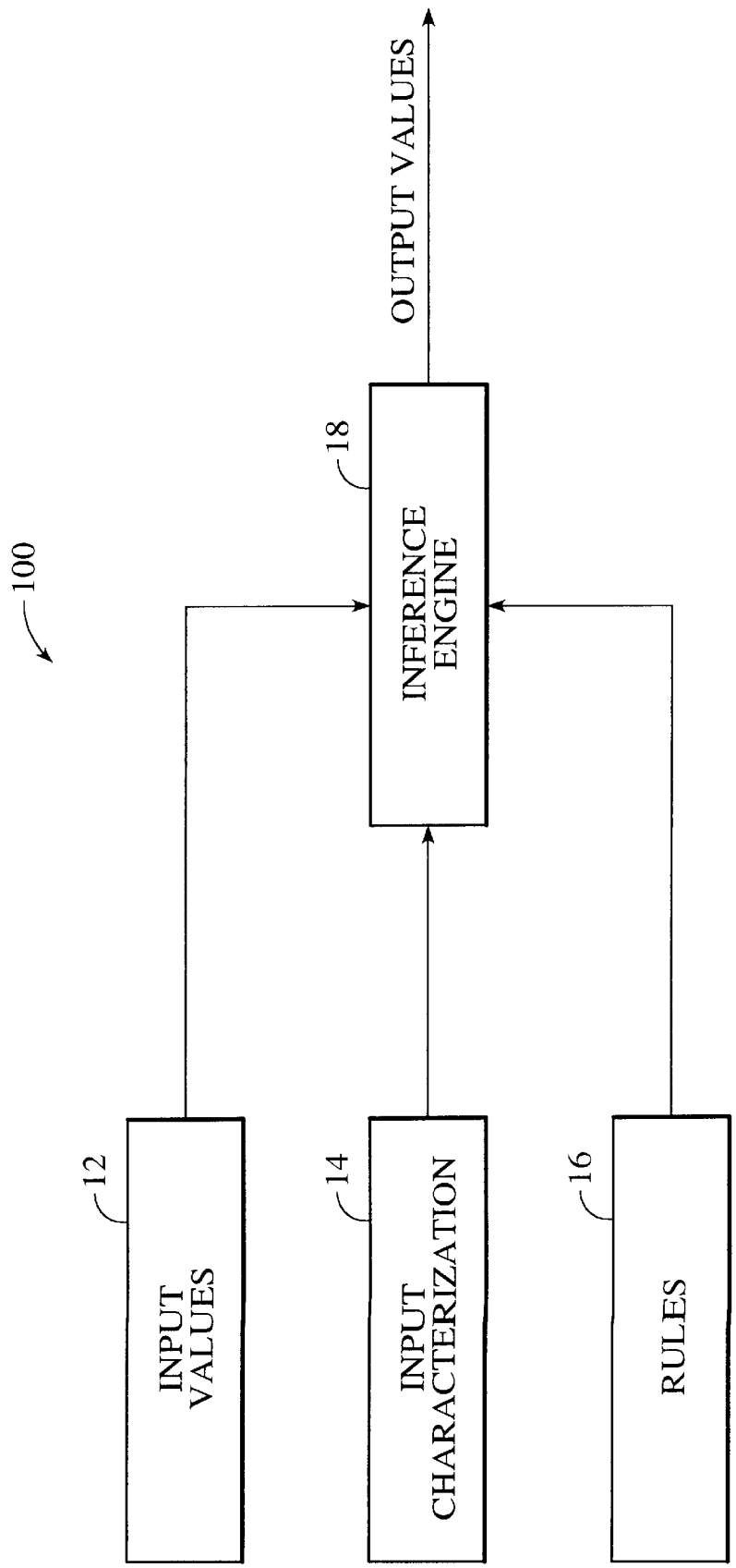
FIG. 2 is a simplified block diagram illustrative of the operating system of FIG. 1 optimized and/or tuned in accordance with the teachings of the present invention.

FIG. 2 is a simplified block diagram illustrative of the operating system of FIG. 1 optimized and/or tuned in accordance with the teachings of the present invention. For each task, at a step 12, the system 100 receives a plurality of input values relating to the status of the operating system, any tasks requested and any other parameters relating thereto as will be appreciated by those skilled in the art. At step 14, the input values are mapped to an appropriate membership function using tools and techniques known in the art such Mathwork's MatLab software.

At step 16, a set of 'if-then' rules are developed which translate the input values to output values depending on the membership function with which the input value is associated and other conditions that are in effect.

When the parameters in the operating system need to be evaluated and possibly modified, the membership functions and control rules are loaded into a fuzzy inference engine 18 and the inputs are applied to produce a new set of values for the parameter group. Inference engines are known in the art and may be implemented in software or hardware. For example, an inference engine is sold by Motorola as a model M68HC12 microcontroller. This machine allows for one to customize the defuzzification process as necessary for a given application.

The invention may be implemented in a UNIX environment as a library routine that is safe to call from kernel or user mode. The parameters would be lists that define the inputs, membership functions and rules. The output would be the resultant crisp value. The use of the routine would be determined for each tunable parameter and could be implemented based on a certain condition or on a time interval.

Figure 3:
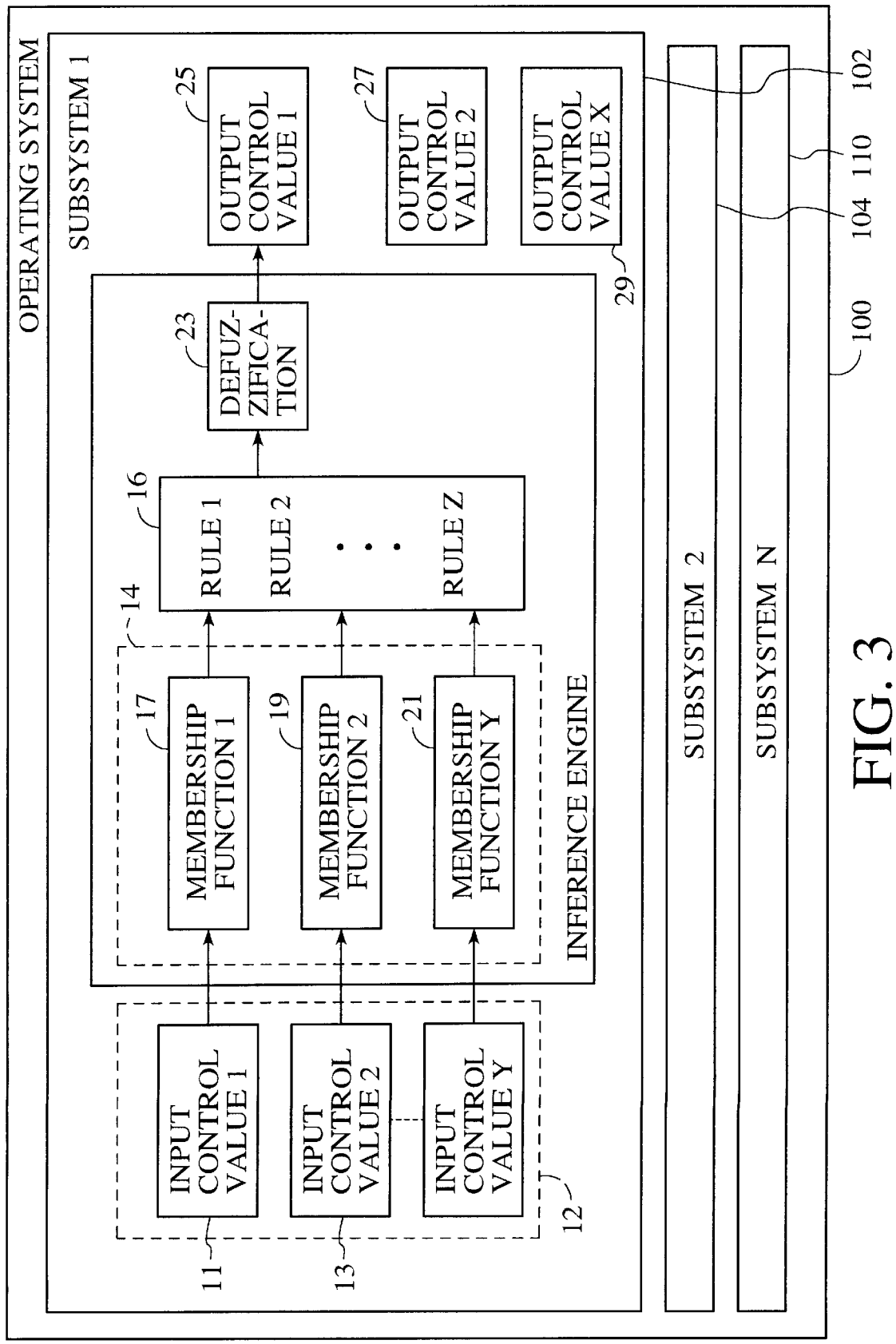
FIG. 3 is a block diagram which shows the operating system of FIG. 2 in greater detail in accordance with the teachings of the present invention.

FIG. 3 is a block diagram which shows the operating system 100 of FIG. 2 in greater detail in accordance with the teachings of the present invention. As shown in FIG. 3, each resource management task is a subsystem of the operating system 100. While only a single subsystem 102 is illustrated in detail, the remaining subsystems 104–110 would be implemented in a similar manner. At step 12, each subsystem receives a plurality of input control values 1–Y (shown at 11–15, odd numbers only). At step 14, each input value 11–15 is characterized in accordance with an associated membership function 17–21 (odd numbers only) respectively. The characterized inputs are provided to a rules base 16. The outputs of the rules base 16 are defuzzified at step 23 and output as a crisp value at step 25.

In the implementation depicted in FIG. 3, the input characterization, application of rules and defuzzification are effected by the inference engine 18. Each subsystem 102–110 includes a plurality of inference engine 18 inputs which output a control value 27–29 as may be required to optimally manage a particular resource. The invention may be best appreciated with reference to the example described with respect to FIG. 4.

Figure 4:
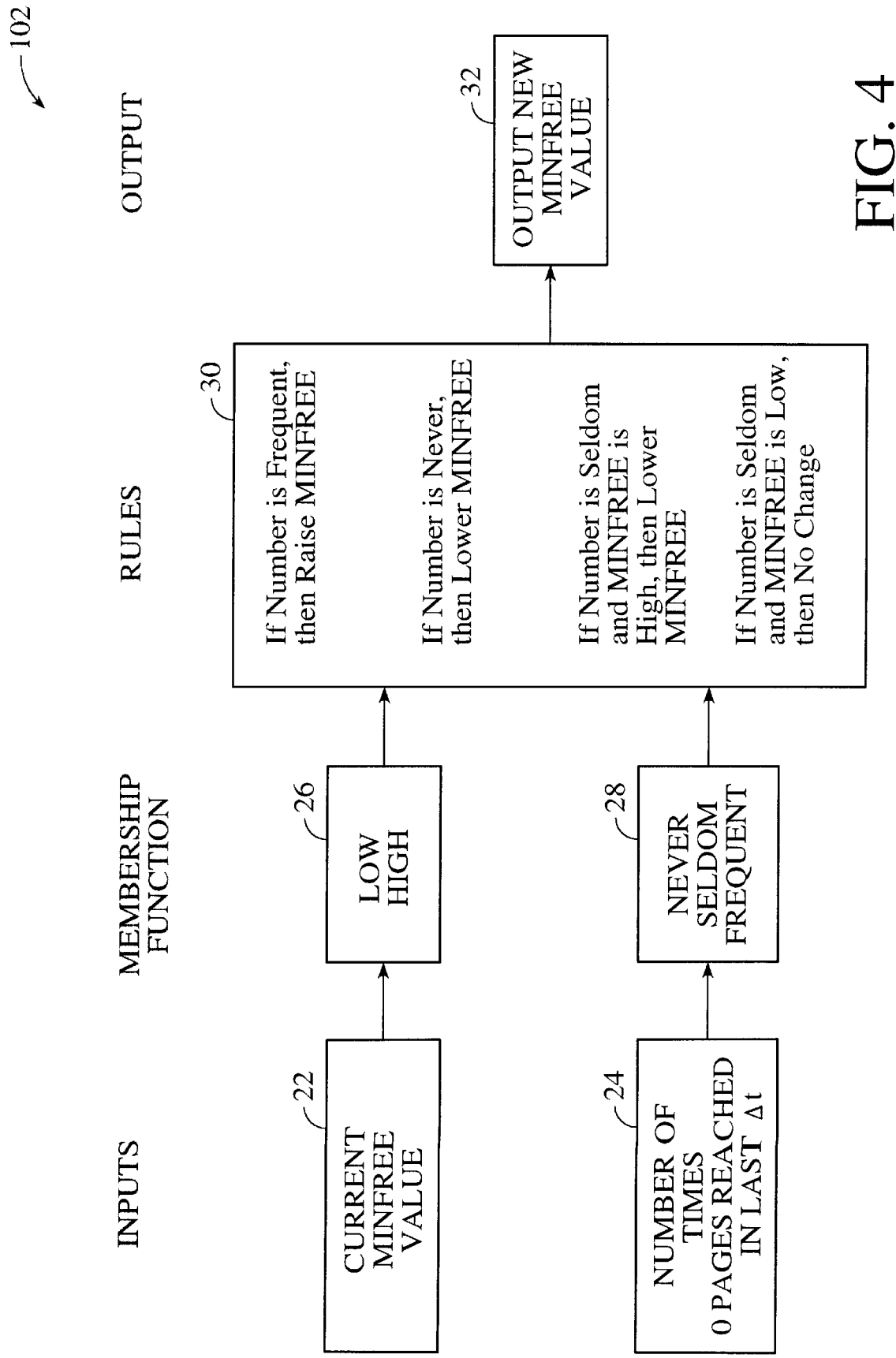
FIG. 4 is a block diagram which illustrates the application of the present invention to a specific operating system task.

FIG. 4 is a block diagram which illustrates the application of the present invention to a specific operating system resource management task within virtual memory management 102. Those skilled in the art will appreciate that the teachings disclosed herein may be applied to other resource management tasks without departing from the scope of the present invention.

In the AIX variant of the UNIX operating system, real memory is divided into pages of 4K (four thousand) bytes each. Pages are allocated to processes as they require memory. If all pages are allocated but more are needed, the contents of some pages are written to the paging device (usually a disk) and those real memory pages are allocated for another process. Two thresholds exist in an AIX based system to manage when pages are written to the paging device: MAXFREE and MINFREE. MINFREE represents the value at which pages begin to be written into the paging device. The number of pages written is MAXFREE–MINFREE, so MAXFREE is the target free memory page count value when paging begins.

A typical goal of an operating system designer is to avoid a situation where there are no free pages of real memory. Hence, when the MINFREE, threshold is reached, MAXFREE–MINFREE pages are written to the paging device using a least recently used (LRU) algorithm. For the purpose of illustration, assume that the difference between MINFREE and MAXFREE is fixed so that when MINFREE is adjusted, MAXFREE will be adjusted by the same amount. As paging is a slow procedure, it should be done as infrequently as possible. However, inasmuch as it is also expensive to run out of free real memory pages, the control problem is to find the optimum balance.

Currently, MINFREE and MAXFREE are manually tunable using a performance tuning program called 'vmtune'. In a UNIX based system, coarse control could be achieved using a 'cron' job, and a finer control with a 'daemon' that runs a program or group of programs at a particular time or on the existence of certain conditions. (In UNIX, a 'daemon' is a routine which is inactive most of the time and which wakes up and runs certain programs at predetermined intervals or when triggered by a predetermined condition becoming true. It runs much more frequently than a cron job in general.)

In any event, the present invention would allow these parameters to be tuned automatically by running the described control function at whatever $\Delta t$ interval is desired. The method and system 20 of FIG. 4 illustrate how this may be achieved. With reference to FIG. 4, a first crisp input value 22 is provided which is the current MINFREE value. A second crisp input value 24 is provided which is the number of times zero free pages was reached during the last time cycle $\Delta t$. The first crisp value 22 is associated with a first membership function 26 which is low or high depending on the value thereof relative to some threshold. The second crisp value 24 is associated with a second membership function 28 based on the frequency thereof. A set of rules 30 are applied by the inference engine 18 to the data in accordance with the membership function association thereof to generate a new MINFREE value at the output 32 thereof.

The rules 30 are accumulated by consulting with experts in the field of operating system design or an expert database. This data allows for the creation of a set of rules which will cause the operating system to output a new value for MINFREE which is optimal for a given application. Each rule has an antecedent and a consequent based on the expert data.

Defuzzification, in this context, involves simply raising or lowering the MINFREE value. In general, the present invention uses a generic format for operating system tunable parameter control rather than having each subsystem contain customized, hidden algorithms (including simple thresholding). Using fuzzy control, the customization comes in defining the inputs, membership functions, rules base (antecedents and consequents) and defuzzification methods to produce a crisp output.

The invention outputs input classifications, sets of membership functions and sets of inference rules for each control parameter to which the invention is applied. This allows one to optimize the tunable portion of the system designed for a particular application and/or user using common sense rules rather than cryptic numerical values and algorithms.

Although the system and method has been described in accordance with the embodiments shown, one of ordinary skill in the art will readily recognize that there could be variations to the embodiments and those variations would be within the spirit and scope of the above-described system and method. For example, the membership functions and control rules could be designed to be as simple or complex as needed for a given set of parameters depending on the degree of control sophistication that the designers determine is appropriate. Accordingly, many modifications may be made by one of ordinary skill in the art without departing from the spirit and scope of the appended claims.

Accordingly,

What is claimed is:

1. A system for customizing an operating system including:
    first means for providing a plurality of input values, wherein the input values comprise tunable parameters of the operating system, wherein the parameters relate to tasks performed by the operating system;
    second means for mapping the input values into at least one membership function; and
    third means for applying a set of resource management rules to generate an output value corresponding to each input value in accordance with the membership function with which the input values are associated, wherein the set of resource management rules pertain to a subsystem of the operating system, wherein the member function and the set of resource management rules are loaded into the third means in response to a predetermined condition.

2. The system of claim 1 wherein each rule is an 'if-then' statement.

3. The system of claim 1 wherein the third means is an inference engine.

4. The system of claim 1 wherein the means for applying a set of resource management rules includes means for developing the rules.

5. The system of claim 1 wherein the means for developing the rules includes means for consulting experts with respect to a resource management task.

6. The system of claim 1 wherein the input values are parameters that are set at installation or boot time that remain fixed until the system is re-installed or re-booted, respectively.

7. The system of claim 1 wherein the input values are parameters that are tuned at predetermined times.

8. The system of claim 1 wherein the input values are parameters that are tuned on demand.

9. The system of claim 1 wherein the input values are parameters that are continuously evaluated and tuned.

10. The system of claim 1, wherein the predetermined condition comprises the need for evaluation of the input values.

11. The system of claim 1, wherein the predetermined condition comprises the need for modification of the input values.

12. The system of claim 2 wherein each membership function is an antecedent for an 'if-then' statement.

13. The system of claim 3 wherein the inference engine is implemented in hardware.

14. The system of claim 5 wherein the means for consulting experts includes means for identifying what resources should be managed and providing information with respect thereto.

15. The system of claim 12 wherein each output value is a consequent for an 'if-then' statement.

16. The system of claim 13 wherein the inference engine is implemented in software.

17. The system of claim 14 wherein the means for consulting experts includes means for identifying how the resources should be managed and providing information with respect thereto.

18. The system of claim 17 wherein the means for developing rules includes means for utilizing the information with respect to what resources should be managed and how to develop the rules.

19. A method for customizing an operating system including the steps of:
    a) providing a plurality of input values to an inference engine, wherein the input values comprise tunable parameters of the operating system, wherein the parameters relate to tasks performed by the operating system;
    b) characterizing the input values in accordance with a membership function; and
    c) applying a set of resource management rules to generate an output corresponding to each input value in accordance with the membership function with which the input values are associated, wherein the set of resource management rules pertain to a subsystem of the operating system, wherein the member function and the set of resource management rules are loaded into the inference engine in response to a predetermined condition.

20. The method of claim 19 wherein each rule is an 'if-then' statement.

21. The method of claim 19 including the step of identifying a task to be designed.

22. The method of claim 19 wherein the step of applying a set of resource management rules includes the step of developing the rules.

23. The method of claim 19 wherein the input values are parameters that are set at installation or boot time that remain fixed until the system is re-installed or re-booted, respectively.

24. The method of claim 19 wherein the input values are parameters that are tuned at predetermined times.

25. The method of claim 19 wherein the input values are parameters that are tuned on demand.

26. The method of claim 19 wherein the input values are parameters that are continuously evaluated and tuned.

27. The method of claim 19, wherein the predetermined condition comprises the need for evaluation of the input values.

28. The method of claim 19, wherein the predetermined condition comprises the need for modification of the input values.

29. The method of claim 20 wherein each membership function is an antecedent for an 'if-then' statement.

30. The method of claim 19 wherein the inference engine is implemented in hardware.

31. The method of claim 22 wherein the step of developing the rules includes the step of consulting experts with respect to each resource management task.

32. The method of claim 29 wherein each output value is a consequent for an 'if-then' statement.

33. The method of claim 30 wherein the inference engine is implemented in software.

34. The method of claim 31 wherein the step of consulting experts includes the step of identifying what resources should be managed and providing information with respect thereto.

35. The method of claim 34 wherein the step of consulting experts includes the step of identifying how the resources should be managed and providing information with respect thereto.

36. The method of claim 35 wherein the step of developing rules includes the step of utilizing the information with respect to what resources should be managed and how to develop the rules.

37. A system for customizing an operating system including:

first means for providing a plurality of input values, wherein the input values comprise tunable parameters of the operating system, wherein the parameters relate to tasks performed by the operating system;

second means for mapping the input values into at least one membership function; and an inference engine for applying a set of resource management rules to generate an output value corresponding to each input value in accordance with the membership function with which the input values are associated, each rule being an 'if-then' statement for which a membership function is an antecedent and an output value is a consequent, wherein the set of resource management rules pertain to a subsystem of the operating system, wherein the member function and the set of resource management rules are loaded into the third means in response to a predetermined condition.

38. A computer readable means including program instructions for customizing an operating system, the program instructions for:

providing a plurality of input values to an inference engine, wherein the input values comprise tunable parameters of the operating system, wherein the parameters relate to tasks performed by the operating system;

characterizing the input values in accordance with a membership function; and applying a set of resource management rules to generate an output corresponding to each input value in accordance with the membership function with which the input values are associated, wherein the set of resource management rules pertain to a subsystem of the operating system, wherein the member function and the set of resource management rules are loaded into the inference engine in response to a predetermined condition.

39. A method for customizing an operating system including the steps of:

a) providing a plurality of input values, wherein the input values comprise tunable parameters of the operating system, wherein the parameters relate to tasks performed by the operating system;

b) loading a membership function associated with the input values into an inference engine in response to a need for evaluating or modifying the input values;

c) loading a set of resource management rules associated with the input values into the inference engine in response to the need for evaluating or modifying the input values, wherein the set of resource management rules pertain to a subsystem of the operating system;

d) characterizing the input values in accordance with a membership function associated with the input values; and e) applying a set of resource management rules associated with the input values to generate an output corresponding to each input value in accordance with the membership function with which the input values are associated.

\* \* \* \* \*